United States Patent [19]
Yamazaki et al.

[11] Patent Number: 5,601,916
[45] Date of Patent: Feb. 11, 1997

[54] MAGNETIC RECORDING MEDIUM HAVING A MAGNETIC LAYER COMPRISING HEXAGONAL FERRITE PARTICLES

[75] Inventors: Nobuo Yamazaki; Hitoshi Noguchi; Shinji Saito, all of Kanagawa, Japan

[73] Assignee: Fuji Photo Film Co., Ltd., Kanagawa, Japan

[21] Appl. No.: 524,680

[22] Filed: Sep. 7, 1995

[30] Foreign Application Priority Data

Oct. 14, 1994 [JP] Japan .................................. 6-249489

[51] Int. Cl.$^6$ .................................................. G11B 5/706
[52] U.S. Cl. ................ 428/329; 428/336; 428/694 BH; 428/694 BM; 428/694 BS; 428/900
[58] Field of Search .................................. 428/329, 336, 428/694 BH, 694 BM, 694 BS, 900

[56] References Cited

U.S. PATENT DOCUMENTS

| | | | |
|---|---|---|---|
| 4,778,734 | 10/1988 | Ohdan et al. .......................... | 428/694 |
| 5,075,169 | 12/1991 | Nagai et al. .......................... | 428/402 |
| 5,079,092 | 1/1992 | Maekawa et al. ...................... | 428/403 |
| 5,114,801 | 5/1992 | Aoki et al. ............................ | 428/694 |
| 5,118,575 | 6/1992 | Maekawa et al. ...................... | 428/403 |
| 5,503,911 | 4/1996 | Aoki et al. ............................ | 428/213 |

FOREIGN PATENT DOCUMENTS 05012650  1/1993  Japan .

*Primary Examiner*—Stevan A. Resan
*Attorney, Agent, or Firm*—Sughrue, Mion, Zinn, Macpeak & Seas

[57] ABSTRACT

A magnetic recording medium is described, which comprises a nonmagnetic support having thereon at least one magnetic layer containing ferromagnetic particles dispersed in a binder, wherein the magnetic recording medium has at least one magnetic layer containing at least hexagonal ferrite magnetic particles and the magnetic layer containing the hexagonal ferrite magnetic particles has a coercive force, Hc, of from 1,300 to 5,000 Oe, a ratio of the Hc to an anisotropic magnetic field HK thereof, Hc/HK, of from 0.30 to 1.0, and a squareness ratio of in-plane direction, SQ, of from 0.65 to 1.00.

2 Claims, No Drawings

MAGNETIC RECORDING MEDIUM HAVING A MAGNETIC LAYER COMPRISING HEXAGONAL FERRITE PARTICLES

FIELD OF THE INVENTION

The present invention relates to a magnetic recording medium for high-density recording which has one or more magnetic layers or has one or more magnetic layers and one or more nonmagnetic layers, in which the uppermost layer contains hexagonal ferrite magnetic particles.

BACKGROUND OF THE INVENTION

Widely used conventional magnetic recording media such as video tapes, audio tapes, and magnetic disks comprise a nonmagnetic support having thereon a magnetic layer comprising particles of ferromagnetic iron oxide, Co-modified ferromagnetic iron oxide, $CrO_2$, ferromagnetic metal, or hexagonal ferrite dispersed in a binder. Of these ferromagnetic materials, hexagonal ferrite is known as a material having excellent suitability for high-density recording. The following are examples of magnetic recording media employing magnetic particles of hexagonal ferrite.

JP-A-60-157719, for example, discloses a magnetic recording medium having a magnetic layer which contains magnetic particles having a particle diameter of from 0.1 to 0.3 µm and has a vertical-direction squareness ratio of 0.7 or more and a surface roughness of 0.05 µm or less. (The term "JP-A" as used herein means an "unexamined published Japanese patent application.") This prior art technique is intended to provide a magnetic recording medium for high-density recording which has a sufficiently high vertical-direction squareness ratio and excellent surface smoothness.

JP-A-62-109226 discloses a magnetic recording medium comprising a support having thereon a magnetic layer which has a thickness of 1.8 µm or less, contains platy magnetic particles having an average particle diameter of 0.2 µm or less and an average aspect ratio of flatness of 6 or more, and has a specific vertical-direction squareness ratio and a specific vertical-direction coercive force. This prior art technique is intended to provide a magnetic recording medium which has excellent running durability during use and satisfactory suitability for overwriting and attains high recording density and high output.

JP-A-64-89022 discloses a magnetic recording medium which employs a binder having a saturation magnetization of 60 emu/g or more, a specific surface area by BET method of from 25 to 70 $m^2/g$, an average particle diameter of from 0.01 to 0.2 µm, and a coercive force of from 400 to 2,000 Oe, and containing a polar group in an amount of $1 \times 10^{-5}$ eq/g or more. This prior art technique is intended to improve reproduced output and attain a high C/N ratio and improved running durability.

JP-A-3-280215 discloses a magnetic recording medium in which the longitudinal-direction coercive force is from 1,000 to 4,000 Oe and the residual magnetization in the longitudinal direction is higher than that in the vertical direction, which in turn is higher than that in the in-plane width direction. This prior art technique is intended to provide a magnetic recording medium for high-density recording which has a satisfactory balance between long-wavelength output and short-wavelength output.

JP-A-5-40370 discloses a magnetic recording medium in which 100 parts by weight of magnetic particles having a specific surface area of from 23 to 45 $m^2/g$ and a coercive force of from 400 to 2,000 Oe are dispersed in from 10 to 40 parts by weight of a resin binder. This prior art technique is intended to provide a magnetic recording medium for high-density recording which is reduced in noise and has excellent orientation.

JP-A-5-12650 discloses a magnetic recording medium which comprises a support, a magnetic layer containing hexagonal ferrite and having a thickness of from 0.1 to 0.6 µm, and a nonmagnetic layer provided between the magnetic layer and the support and having a larger thickness than the magnetic layer. This prior art technique is intended to improve surface properties, short-wavelength output, erasion characteristics, and durability.

JP-A-5-225547 discloses a magnetic recording medium comprising a nonmagnetic support, a nonmagnetic layer provided thereon, and a magnetic layer provided on the nonmagnetic layer and containing 0.1 µm or less magnetic particles. This prior art technique is intended to provide a magnetic recording medium having excellent high-frequency electromagnetic characteristics, satisfactory suitability for signal overwriting, and good durability.

In JP-A-3-286420, *IEEE. Trans. Mag.*, Vol. 24, No. 6, Nov. 1988, p. 2850, there is a description to the effect that the electromagnetic characteristics of a magnetic recording medium containing hexagonal ferrite are influenced by the anisotropic magnetic field HK of the ferrite. The former reference discloses a magnetic recording medium which has two magnetic layers provided on a nonmagnetic layer and in which the lower magnetic layer has an axis of easy magnetization in the longitudinal direction and the upper magnetic layer contains magnetic particles having an anisotropic magnetic field of 3,000 Oe or less; this prior art technique is intended to provide a magnetic recording medium which attains high output over a wide range from a long-wavelength region to a short-wavelength region.

Furthermore, a large number of inventions concerning a squareness ratio SQ in magnetic recording media are disclosed in JP-A-60-164925 and JP-A-3-49025.

However, the invented prior art recording media employing hexagonal ferrite described above have failed to fully exhibit their performances although effective in some degree. There has been much room for an improvement in output, especially in the ultrashort-wavelength region (usually, recording wavelengths of 0.5 µm and less), but conditions under which such improvement is attained have been unable to be found.

SUMMARY OF THE INVENTION

An object of the present invention is to provide a magnetic recording medium remarkably improved in electromagnetic characteristics, in particular ultrashort-wavelength output necessary to high-density recording, which has long been required of magnetic recording media.

The present inventors made intensive studies in order to obtain a magnetic recording medium having satisfactory electromagnetic characteristics.

As a result, this and other objects of the present invention have been attained by a magnetic recording medium comprising a nonmagnetic support having thereon at least one magnetic layer containing ferromagnetic particles dispersed in a binder, wherein the magnetic recording medium has at least one magnetic layer containing at least hexagonal ferrite magnetic particles and the magnetic layer containing the hexagonal ferrite magnetic particles has a coercive force, Hc, of from 1,300 to 5,000 Oe, a ratio of the Hc to an anisotropic magnetic field HK thereof, Hc/HK, of from 0.30 to 1.0, and a squareness ratio of in-plane direction, SQ, of from 0.65 to 1.00.

DETAILED DESCRIPTION OF THE INVENTION

The present invention is characterized in that the magnetic layer containing hexagonal ferrite magnetic particles has specific values of Hc, Hc/HK, and SQ of in-plane direction. As a result, the magnetic recording medium of the present invention retains remarkably improved ultrashort-wavelength output necessary to high-density recording.

Although the reason why the magnetic recording medium of the present invention shows excellent electromagnetic characteristics has not been elucidated, the following explanations are possible. The Hc/HK ratio, i.e., the ratio of coercive force Hc to anisotropic magnetic field HK, is a factor which influences the mechanism of the reversal of magnetization; a magnetic layer having a higher Hc/HK ratio has a greater possibility that the reversal of magnetization occurs as a result of simultaneous rotation. That is, magnetic materials which attain a higher Hc value are more apt to undergo such phenomenon than magnetic materials showing the same HK value. It is presumed that a magnetic layer in which the reversal of magnetization occurs as a result of simultaneous rotation shows more rapid switching with changing recording magnetic field and, hence, the regions of the reversal of magnetization which are recorded on the magnetic recording medium account for a reduced proportion. Namely, it is thought that a magnetic recording medium having a high Hc/HK ratio basically has the ability to attain high output. On the other hand, rapid switching tends to disadvantageously cause demagnetization, i.e., the phenomenon in which recorded signals are erased when the recording head separates from the recording medium. Consequently, a high Hc/HK ratio alone is incapable of enabling the magnetic recording medium to fully exhibit the basic high-output performance. It is thought that the Hc should be increased in order to inhibit demagnetization as much as possible. On the other hand, SQ values less than 0.65 weaken the effect of Hc/HK ratio, probably because such a nearly randomly oriented state results in an increased proportion of the regions of the reversal of magnetization and this counteracts the effect of a high Hc/HK ratio. To sum up, a magnetic recording medium having a high Hc/HK ratio basically has the ability to attain high output, but it should further has a high Hc value and an SQ value in a specific range so as to fully exhibit that performance. The magnetic recording medium of the present invention satisfies the above requirement, which fact is thought to be the reason why the magnetic recording medium of the present invention has high output.

In the present invention, the magnetic layer has an Hc/HK ratio of from 0.30 to 1.0, preferably from 0.40 to 1.0, and more preferably from 0.60 to 1.0. The Hc of the magnetic layer is from 1,300 to 5,000 Oe, preferably from 1,300 to 3,000 Oe, and more preferably from 1,700 to 2,500 Oe. Further, the magnetic layer has a squareness ratio of in-plane direction, SQ of from 0.65 to 1.00, preferably from 0.65 to 0.95, and more preferably from 0.80 to 0.95. The HK of the magnetic layer is desirably 3,000 Oe or more.

The performance of the head to be used for recording or reproducing is preferably taken in account when an Hc value is decided. Specifically, Hc values of 1,300 Oe or more are suitable for the currently used heads having a Bs of about 1 T (tesla), while Hc values of 1,700 Oe or more are suitable for heads employing a high-Bs material, e.g., Fe-Ta-N, and having a Bs of about from 1.2 to 1.8 T. The upper limit of Hc varies depending on head materials, and is hence unable to be specified unconditionally. However, it may be about 4,000 Oe.

In producing the magnetic recording medium of the present invention, the magnetic layer supported on the nonmagnetic support which layer contains hexagonal ferrite magnetic particles and satisfies the property requirements specified above (hereinafter this magnetic layer being referred to also as "upper layer" or "upper magnetic layer") may be provided on a nonmagnetic layer comprising inorganic nonmagnetic particles dispersed in a binder, or on a lower magnetic layer comprising ferromagnetic particles dispersed in a binder, or on a multilayer structure comprising the nonmagnetic layer and the lower magnetic layer. In this invention, the term "lower layer" is often used when the nonmagnetic layer and/or the lower magnetic layer provided under the upper layer is referred to without being distinguished from each other, although the term "lower nonmagnetic layer" or "lower magnetic layer" is used when one of the two underlying layers is referred to. In the case of forming both lower nonmagnetic layer and lower magnetic layer as the lower layer, either layer may be formed first, and the effect of the invention is basically obtainable regardless of the sequence of layer formation. If desired and needed, the upper magnetic layer, the lower nonmagnetic layer, and the lower magnetic layer each may have a multilayer structure.

The upper layer may contain another kind of ferromagnetic particles in combination with the ferrite particles if desired and needed. However, the proportion of the hexagonal ferrite magnetic particles is usually from 50 to 100% by weight, preferably from 80 to 100% by weight, based on all ferromagnetic particles in the upper layer. The ferromagnetic particles for use in the lower layer are not particularly limited, and the same hexagonal ferrite magnetic particles as in the upper layer are usable. The lower layer is free from the requirements concerning Hc, Hc/HK, and in-plane direction SQ which the upper layer is required to satisfy. The term "ferromagnetic particles" used hereinafter means any kind of ferromagnetic particles including hexagonal ferrite magnetic particles, unless otherwise indicated.

In the magnetic recording medium of the present invention, the magnetic layer containing hexagonal ferrite particles may be the only layer. However, a lower nonmagnetic layer is preferably provided between the magnetic layer and the support, because the formation of a lower nonmagnetic layer not only contributes to an improvement in surface properties but also facilitates a thickness reduction for the upper layer. A lower magnetic layer containing acicular ferromagnetic particles or other magnetic particles is also preferably provided as another lower layer between the upper magnetic layer and the support, because the lower magnetic layer contributes to an improvement in long-wavelength electromagnetic characteristics.

The residual magnetic flux density (Br) of the magnetic layer containing hexagonal ferrite particles is preferably 1,000 G or more. If the Br thereof is less than 1,000 G, output decreases over the whole wavelength region. There is no particular upper limit to the Br thereof. The SFD of the magnetic layer is 0.5 or less, preferably 0.3 or less.

The thickness of the magnetic layer containing hexagonal ferrite particles is preferably 3 μm or less, and may be varied according to purposes. For example, if the magnetic layer Containing hexagonal ferrite particles is the only magnetic layer, the thickness thereof is preferably from 0.5 to 3 μm. If a lower layer is provided, the thickness of the upper layer is preferably from 0.01 to 1 μm.

If a lower magnetic layer is provided, the ferromagnetic particles contained therein are preferably fine ferromagnetic particles of metal comprising iron as the main component or particles of either cobalt-modified iron oxide or iron oxide. If a lower nonmagnetic layer is provided, the inorganic nonmagnetic particles contained therein are preferably particles of at least one of titanium dioxide, barium sulfate, zinc oxide, and s-iron oxide.

The lower layer and the upper layer are preferably coated by a wet-on-wet coating method according to U.S. Pat. No. 4,844,946.

Examples of methods that can be used for practicing the present invention include the following. However, usable methods are, of course, not limited thereto, and methods other than those can be used to attain the object of the invention as long as the requirements specified hereinabove are satisfied.

A magnetic coating fluid containing hexagonal ferrite particles dispersed therein and a magnetic coating fluid containing nonmagnetic particles or ferromagnetic particles dispersed therein are applied to a nonmagnetic support in such amounts as to result in an upper-layer thickness of 2.0 μm or less. Before the coating dries, the coated support is passed through a magnetic field for longitudinal orientation. Calendering is then conducted with metal rolls arranged in a multi-stage stack. Thus, the magnetic recording medium of the present invention can be produced. Although the reasons for those treatments have not been elucidated, the following explanations are possible. The orientation treatment in which the coated support having a wet coating is passed through a magnetic field for longitudinal orientation is intended to longitudinally orient a certain proportion of the hexagonal ferrite particles contained in the magnetic recording medium. Longitudinal orientation herein means to align individual hexagonal ferrite particles so that the axis of easy magnetization for each particle is directed to the direction of the length of the magnetic recording medium.

An important point in this longitudinal orientation is that this treatment is performed so that the finished magnetic recording medium has a regulated SQ value within the range specified hereinabove. For attaining this, the wet coating which is being passed through a longitudinal magnetic field should be dried to some degree during the orientation.

For this purpose, it is preferred to use an apparatus capable of feeding heated dry air to the longitudinal magnetic-field zone and capable of evacuating the air. It is also possible to utilize a difference in boiling point between the organic solvents used in the magnetic coating fluid and the nonmagnetic coating fluid; namely, a low-boiling organic solvent and a high-boiling organic solvent may be used in combination. Although the degree of drying of the coating formed on the support is difficult to determine, it can be estimated from a measurement of the concentration of the organic solvents in the gas discharged from the magnetic-field zone for longitudinal orientation. Specifically, the orientation zone is preferably constructed so that about from 70 to 90% of the organic solvents contained in the applied magnetic and nonmagnetic coating fluids can be evaporated.

The hexagonal ferrite magnetic particles for use in the upper layer are then explained below.

Examples of the hexagonal ferrite contained in the upper layer in the present invention include substitutional ferrites such as barium ferrite, strontium ferrite, lead ferrite, and calcium ferrite, and Co-substituted ferrites. Specific examples thereof include barium ferrite and strontium ferrite both of the magnetoplumbite type and barium ferrite and strontium ferrite both of the magnetoplumbite type containing a spinel phase as a part thereof. Besides the constituent atoms, these ferrites may contain other atoms such as, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. In general, hexagonal ferrites containing elements such as Co—Ti, Co—Ti—Zr, Co—Ti—Zn, Ni—TiZn, and Nb—Zn, can be used. The longitudinal-direction SFD of the upper layer is preferably 0.3 or less, because such an SFD value advantageously results in a narrower coercive-force distribution. The coercive force can be controlled, for example, by regulating the particle diameter or particle thickness of the hexagonal ferrite, by regulating the thickness of the spinal phase of the hexagonal ferrite, by regulating the amount of a substituent element in the spinel phase, or by changing the substitution sites in the spinel phase. The hexagonal ferrite for use in the present invention is usually in the form of hexagonal platy particles; the diameter of these particles, which means the width of the hexagonal plates, is determined with an electron microscope.

In the present invention, the particle diameter (plate diameter) of the hexagonal ferrite is usually from 0.01 to 0.2 μm, preferably from 0.02 to 0.1 μm. The average thickness (plate thickness) of the fine particles is usually from 0.001 to 0.2 μm, preferably from 0.003 to 0.05 μm. The aspect ratio thereof regarding degree of flatness (particle diameter/plate thickness) is from 1 to 15, preferably from 3 to 7. The crystallite size thereof is from 50 to 450 Å, preferably from 100 to 350 Å. Further, the specific surface area of these fine hexagonal-ferrite particles as measured by the BET method ($S_{BET}$) is from 25 to 100 $m^2/g$, preferably from 40 to 70 $m^2/g$. Specific surface areas thereof less than 25 $m^2/g$ are undesirable in that an increased noise results, while specific surface areas thereof exceeding 100 $m^2/g$ are undesirable in that satisfactory surface properties are difficult to obtain. The magnetic particles preferably have a water content of from 0.01 to 2%; the water content thereof is preferably optimized according to the kind of the binder used. The pH of the magnetic particles, which is preferably optimized according to the kind of the binder used, is from 4 to 12, preferably from 6 to 10. If desired and needed, the surface of the magnetic particles may be treated, for example, with Al, Si, P, or oxide thereof. Preferred is a surface treatment with $Al_2O_3$ or $SiO_2$. The amount or proportion of the surface-treating agent, which is desirably varied according to the kind of the binder used, is from 0.1 to 10% based on the amount of the magnetic particles. This surface treatment is advantageous in that it reduces the adsorption of a lubricant, e.g., a fatty acid, to 100 $mg/m^2$ or less. Although there are cases where the magnetic particles contain soluble inorganic ions of, e.g., Na, Ca, Fe, Ni, and Sr, these ions do not particularly influence the properties of the upper layer as long as the concentration thereof is 500 ppm or less. The magnetic particles have a σs of 50 emu/g or more, preferably 60 emu/g or more, and a tap density of preferably 0.5 g/cc or more, more preferably 0.8 g/cc or more. For producing the hexagonal ferrite for use in the present invention, any of various methods may be used such as a glass crystallization method, a coprecipitation method, and a hydrothermal reaction method.

Known ferromagnetic particles may be employed as the ferromagnetic particles used in the lower magnetic layer in the present invention. Examples thereof include γ-FeO$_x$ ($_x$=1.33–1.5), Co-modified γ-FeO$_x$ ($_x$=1.33–1.5), ferromagnetic alloy fine particles containing Fe, Ni, or Co as the main component (75% or more), and acicular barium ferrite. Preferred of these are particles of a ferromagnetic alloy containing α-Fe as the main component and the Co-modified γ-FeOx. Besides the atoms specified above, the ferromagnetic particles may contain other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb.

Before being dispersed, the fine ferromagnetic particles may be treated with, for example, a dispersant, a lubricant, a surfactant, or an antistatic agent. These treatments are described in, for example, JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014. (The term "JP-B" as used herein means an "examined Japanese patent publication.")

The fine ferromagnetic alloy particles among the ferromagnetic particles of the above-enumerated kinds may contain a small amount of hydroxide or oxide. For obtaining the fine ferromagnetic alloy particles for use in the present invention, a known method may be used. Examples thereof include: a method in which reduction is conducted with an organic acid double salt (consisting mainly of oxalate) and a reducing gas such as hydrogen; a method comprising reducing iron oxide with a reducing gas such as hydrogen to obtain Fe or Fe-Co particles; a method comprising pyrolyzing a metal carbonyl compound; a method in which reduction is conducted by adding a reducing agent such as sodium boron hydride, hypophosphite, or hydrazine to an aqueous solution of ferromagnetic metal; and a method comprising vaporizing metal in a low-pressure inert gas to obtain fine particles. The thus-obtained ferromagnetic alloy particles may be used after undergoing a known gradual oxidation treatment. This treatment can be conducted by any of the following: a method comprising immersing the particles in an organic solvent, followed by drying; a method comprising immersing the particles in an organic solvent and feeding an oxygen-containing gas to form an oxide film on the surfaces, followed by drying; and a method in which an oxide film is formed on the surfaces by controlling the partial pressures of oxygen gas and an inert gas, without using an organic solvent. The ferromagnetic particles have a specific surface area as determined by the BET method of from 25 to 80 $m^2$/g, preferably from 40 to 70 $m^2$/g. Specific surface areas thereof less than 25 $m^2$/g are undesirable in that an increased noise results, while specific surface areas thereof more than 80 $m^2$/g are undesirable in that satisfactory surface properties are difficult to obtain. The σs of the magnetic iron oxide particles is 50 emu/g or more, preferably 70 emu/g or more, while the σs of the fine ferromagnetic metal particles is preferably 100 emu/g or more, more preferably from 110 to 170 emu/g. The coercive force thereof is preferably from 500 to 2,500 Oe, more preferably from 800 to 2,000 Oe.

The tap density of y-iron oxide is preferably 0.5 g/cc or more, more preferably 0.8 g/cc or more. In alloy particles, the tap density thereof is preferably from 0.2 to 0.8 g/cc. Tap densities of alloy particles more than 0.8 g/cc tend to result in acceleration of the oxidation of the ferromagnetic particles during compaction, so that a sufficient so is difficult to obtain. If the tap density of alloy particles is less than 0.2 g/cc, insufficient dispersion tends to result. In using γ-iron oxide, the proportion of divalent iron to trivalent iron is preferably from 0 to 20%, more preferably from 5 to 10%. Further, the amount of cobalt atoms is from 0 to 15%, preferably from 2 to 8%, based on the amount of iron atoms.

The lower magnetic layer formed under the upper magnetic layer containing a hexagonal ferrite in the magnetic recording medium of the present invention preferably has a higher degree of orientation in the longitudinal direction than in the vertical direction. The lower magnetic layer preferably has a coercive force of from 500 to 2,500 Oe, a squareness ratio of from 0.6 to 0.95, a Br of from 1,000 to 4,000 G, and an SFD of 0.6 or lower.

The center-line average surface roughness of each of the lower layer and the upper layer in the present invention is preferably 0.006 μm or less, if the individual layers (which each may have a multilayer structure) are separately coated.

The lower nonmagnetic layer is explained below.

The inorganic nonmagnetic particles for use in the lower nonmagnetic layer of the magnetic recording medium of the present invention can be selected from inorganic compounds such as metal oxides, metal carbonates, metal sulfates, metal nitrides, metal carbides, and metal sulfides. Specific examples of such inorganic compounds include m-alumina having an α-alumina structure content of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. These may be used alone or in combination. Particularly preferred of these are titanium dioxide, zinc oxide, iron oxide, and barium sulfate. The particle sizes of these nonmagnetic particles are preferably from 0.005 to 2 μm. It is, however, possible to use a combination of two or more kinds of nonmagnetic particles having different particle sizes if desired and needed. Alternatively, the same effect can be produced by using one kind of nonmagnetic particles having a wide particle diameter distribution. The especially preferred range of the particle size is from 0.01 to 0.2 μm. The tap density thereof is from 0.05 to 2 g/cc, preferably from 0.2 to 1.5 g/cc. The water content thereof is from 0.1 to 5%, preferably from 0.2 to 3%. The pH thereof is from 2 to 11, especially preferably from 6 to 9. The specific surface area thereof is from 1 to 100 $m^2$/g, preferably from 5 to 50 $m^2$/g, and more preferably from 7 to 40 $m^2$/g. The crystallite size thereof is preferably from 0.01 to 2 μm. The oil absorption thereof as measured with DBP is from 5 to 100 ml/100g, preferably from 10 to 80 ml/100g, and more preferably from 20 to 60 ml/100g. The specific gravity thereof is from 1 to 12, preferably from 3 to 6. The particle shape thereof may be any of the acicular, spherical, polyhedral, platy, or hexagonal platy shapes. In acicular particles, the aspect ratio thereof is preferably from 2 to 15. The ignition loss thereof is preferably 20% or lower. The inorganic particles for use in the present invention preferably have a Mohs' hardness of from 4 to 10. The roughness factors of the surfaces of these kinds of particles are desirably from 0.8 to 1.5, preferably from 0.9 to 1.2. The SA adsorption thereof is from 1 to 20 μmol/$m^2$, preferably from 2 to 15 μmol/$m^2$. The nonmagnetic particles for use in the lower layer preferably have a heat of wetting by water in the range of from 200 to 600 erg/$cm^2$ at 25° C. A solvent which gives a heat of wetting in the above range can be used. The appropriate number of water molecules present on the surfaces thereof at 100° to 400° C. is from 1 to 10 per 100 $Å^2$. The isoelectric-point pH thereof in water is preferably from 3 to 6. The surfaces of these particles are preferably treated with $Al_2O_3$, $SiO_2$, $TiO_2$, $ZrO_2$, $SnO_2$, $Sb_2O_3$, or ZnO. Of these, $Al_2O_3$, $SiO_2$, $TiO_2$, and $ZrO_2$ are preferred from the standpoint of dispersibility, with $Al_2O_3$, $SiO_2$, and $ZrO_2$ being particularly preferred. These may be used in combination or alone. A treated surface layer formed by coprecipitation may be used according to purpose. It is also possible to use a treated surface layer having a structure formed by first treating with alumina and then treating the resulting surface layer with silica, or to use a treated surface layer having a structure which is the reverse of the above structure. Although the treated surface layer may be made porous if desired and needed, a homogeneous and dense surface layer is generally preferred.

Specific examples of inorganic nonmagnetic particles for use in the present invention include UA5600, UA5605, and Nanotite manufactured by Showa Denko K.K.; AKP-20, AKP-30, AKP-50, HIT-55, HIT-100, and ZA-G1 manufactured by Sumitomo Chemical Co., Ltd.; G5, G7, and S-1 manufactured by Nippon Chemical Industrial Co., Ltd.; TF-100, TF-120, TF-140, R516, DPN250, and DPN250BX manufactured by Toda Kogyo Co., Ltd.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680, and TY-50 manufactured by Ishihara Sangyo Kaisha, Ltd.; ECT-52, STT-4D, STT-30D, STT-30, and STT-65C manufactured by Titan Kogyo K.K.; T-1 manufactured by Mitsubishi Material Co., Ltd.; NS-0, NS-3Y, and NS-8Y manufactured by Nippon Shokubai Kagaku Kogyo Co., Ltd.; MT-100S, MT-100T, MT-150W, MT-500B, MT-600B, and MT-100F manufactured by Teika Co., Ltd.; FINEX-25, BF-1, BF-10, BF-20, BF-1L, and BF-10P manufactured by Sakai Chemical Industry Co., Ltd.; DEFIC-Y and DEFIC-R manufactured by Dowa Mining Co., Ltd.; and Y-LOP manufactured by Titan Kogyo K.K. and nonmagnetic particles obtained by calcining them.

Especially preferred inorganic nonmagnetic particles are titanium dioxide particles. Hence, titanium dioxide is described in detail with respect to production processes thereof. For producing titanium dioxide products, the sulfuric acid process and the chlorine process are mainly used. In the sulfuric acid process, a raw ore of ilmenite is leached with sulfuric acid to extract, e.g., Ti, Fe as sulfates. The iron sulfate is removed by crystallization, and the remaining titanyl sulfate solution is purified by filtration and then subjected to hydrolysis with heating to thereby precipitate hydrous titanium oxide. This precipitate is separated by filtration and then washed to remove impurities. Calcination of the resulting precipitate at 80 to 1,000° C after addition of a particle size regulator or the like gives crude titanium oxide. The titanium oxide is of rutile form or anatase form according to the nucleating agent added in hydrolysis. This crude titanium oxide is ground, sieved, and subjected to, e.g., surface treatment, thereby to produce a titanium dioxide product. In the chlorine process, natural or synthetic rutile is used as the raw ore. The ore is chlorinated under high-temperature reducing conditions to convert the Ti to $TiCl_4$ and the Fe to $FeCl_2$, and the iron chloride is solidified by cooling and separated from the liquid $TiCl_4$. The crude $TiCl_4$ obtained is purified by rectification and a nucleating agent is added thereto. This crude $TiCl_4$ is instantaneously reacted with oxygen at a temperature of 1,000° C. or more to obtain crude titanium oxide. For imparting pigmenting properties to the crude titanium oxide yielded in the above oxidative decomposition step, the same finishing technique as in the sulfuric acid process is employed. The surface treatment of the titanium oxide material may be conducted as follows. The material is dry-ground, and water and a dispersant are then added thereto. The resulting slurry is subjected to wet grinding, followed by centrifugal separation to separate coarse particles. The resulting slurry of fine particles is then transferred to a surface treatment tank, where surface covering with a metal hydroxide is performed. First, an aqueous solution of a predetermined amount of a salt of, e.g., Al, Si, Ti, Zr, Sb, Sn, Zn is added to the slurry and an acid or alkali is added to neutralize the resulting slurry to thereby form a hydrous oxide and cover the surfaces of the titanium oxide particles with the oxide. The water-soluble salts formed as by-products are removed by decantation, filtration, and washing. The slurry is subjected to final pH adjustment, filtration, and washing with pure water. The resulting cake is dried with a spray dryer or band dryer. Finally, the dry particles are ground with a jet mill to give a product. In place of such a wet process, the surface treatment can be conducted by passing vapors of $AlCl_3$ and $SiCl_4$ through titanium oxide particles and then passing water vapor to treat the particle surfaces with Al and Si. With respect to processes for the production of other pigments, reference may be made to *Characterization of Powder Surfaces*, published by Academic Press.

Carbon black may be incorporated into the lower layer, whereby the known effect of reducing Rs can be produced. For this purpose, carbon black such as furnace black for rubbers, thermal black for rubbers, coloring black, and acetylene black can be used. The specific surface area of the carbon black is from 100 to 500 $m^2/g$, preferably from 150 to 400 $m^2/g$, and the DBP absorption thereof is from 20 to 400 ml/100g, preferably from 30 to 200 ml/100g. The particle diameter thereof is from 5 to 80 mμ, preferably from 10 to 50 mμ, and more preferably from 10 to 40 mμ. The carbon black preferably has a pH of from 2 to 10, a water content of from 0.1 to 10%, and a tap density of from 0.1 to 1 g/cc. Specific examples of carbon black for use in the present invention include BLACKPEARLS 2000, 1300, 1000, 900, 800, 880, 700, and VULCAN XC-72 manufactured by Cabot Corporation; #3050B, #3150B, 3250B, #3750B, #3950B, #950, #650B, #970B, #850B, and MA-600 manufactured by Mitsubishi Kasei Corporation; CONDUCTEX SC manufactured by Columbia Carbon Co.; RAVEN 8800, 8000, 7000, 5750, 5250, 3500, 2100, 2000, 1800, 1500, 1255, and 1250 manufactured by RAVEN; and Ketjen Black EC manufactured by Lion Akzo Co., Ltd. These carbon blacks may be surface-treated with a dispersant or another agent or grafted with a resin before use. Carbon black whose surfaces have been partly graphitized may also be used. Further, before being added to a coating fluid, the carbon black may be dispersed into a binder. These carbon blacks can be used in an amount of 50% or less by weight based on the inorganic particles and 40% or less based on the total weight of the nonmagnetic layer. These carbon blacks can be used alone or in combination. With respect to carbon blacks usable in the present invention, reference may be made to, for example, *Carbon Black Binran* (*Carbon Black Handbook*), edited by Carbon Black Association.

Organic particles for use in the present invention include acrylic-styrene resin particles, benzoguanamine resin particles, melamine resin particles, and phthalocyanine pigments. Other usable examples thereof include polyolefin resin particles, polyester resin particles, polyamide resin particles, polyimide resin particles, and poly(ethylene fluoride) resins. For producing these organic particles, techniques such as those described in JP-A-62-18564 and JP-A-60-255827 can be used.

It should be noted that although an undercoat layer is provided in ordinary magnetic recording media, this undercoat layer, which has a thickness of 0.5 μm or less, is intended to improve adhesion between the support and the magnetic or another layer and is different from the lower layer in the present invention. In the present invention also, an undercoat layer is preferably provided to improve adhesion between the lower layer and the support.

The same binders, lubricants, dispersants, additives, solvents, and dispersing techniques as those for the upper magnetic layer can be used for the lower nonmagnetic layer. In particular, with respect to the amounts and kinds of binders and the amounts and kinds of additives and dispersants, known techniques usable for magnetic layers can be applied. The thickness of the lower nonmagnetic layer is from 0.2 to 5 μm, preferably from 1 to 3 μm.

The binder for use in the upper layer and the lower layer in the present invention may be a conventionally known thermoplastic resin, thermosetting resin, or reactive resin, or a mixture thereof.

The thermoplastic resin may be one having a glass transition temperature of from −100° to 150° C., a number-average molecular weight of from 1,000 to 200,000, preferably from 10,000 to 100,000, and a degree of polymerization of about from 50 to 1,000. Examples of the thermoplastic resins include polymers or. copolymers containing a structural unit derived from vinyl chloride, vinyl acetate, vinyl alcohol, maleic acid, acrylic acid, acrylic ester, vinylidene chloride, acrylonitrile, methacrylic acid, methacrylate, styrene, butadiene, ethylene, vinyl butyral, vinyl acetal, or vinyl ether, polyurethane resins, and various rubber-type resins.

Examples of the thermosetting or reactive resin include phenolic resins, epoxy resins, thermosetting polyurethane resins, urea resins, melamine resins, alkyd resins, reactive acrylic resins, formaldehyde resins, silicone resins, epoxy-polyamide resins, mixtures of polyester resin and isocyanate prepolymer, mixtures of polyester polyol and polyisocyanate, and mixtures of polyurethane and polyisocyanate. These resins are described in detail in *Plastic Handbook* published by Asakura Shoten. It is also possible to use a known resin of the electron beam-curing type for each of the layers. Examples of the resins and production processes therefor are described in detail in JP-A-62-256219.

The resins enumerated above can be used alone or in combination. Preferred examples of those include combinations of a polyurethane resin with at least one member selected from vinyl chloride resins, vinyl chloride-vinyl acetate resins, vinyl chloride-vinyl acetate-vinyl alcohol resins, and vinyl chloride-vinyl acetate-maleic anhydride copolymers, and further include combinations of these with polyisocyanate.

The polyurethane resins may have a known structure such as polyester polyurethane, polyether polyurethane, polyether polyester polyurethane, polycarbonate polyurethane, polyester polycarbonate polyurethane, or polycaprolactone polyurethane. For obtaining further improved dispersibility and durability, it is preferred to use, according to need, one or more of the above-enumerated binders which have, incorporated therein through copolymerization or addition reaction, at least one polar group selected from —COOM, —SO$_3$M, —OSO$_3$M, —P=O(OM)$_2$, —O—P=O(OM)$_2$ (where M is a hydrogen atom or an alkali metal salt group), —OH, —NR$_2$, —N$^+$R$_3$ (R represents a hydrocarbon group), an epoxy group, —SH, and —CN. The amount of the polar group(s) is from $10^{-1}$ to $10^{-8}$ mol/g, preferably from $10^{-2}$ to $10^{-6}$ mol/g.

Specific examples of those binders for use in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corp.; MPR-TA, MPR-TA5, MPR-TAL, MPR-TSN, MPR-TMF, MPR-TS, MPR-TM, and MPR-TAO manufactured by Nisshin Chemical Industry Co., Ltd.; 1000W, DX80, DX81, DX82, DX83, and 100FD manufactured by Denki Kagaku Kogyo K.K.; MR-105, MR110, MR100, and 400X-110A manufactured by Nippon Zeon Co., Ltd.; Nippolan N2301, N2302, and N2304 manufactured by Nippon Polyurethane Industry Co. Ltd.; Pandex T-5105, T-R3080, T-5201, Burnock D-400, D-210-80, Crisvon 6109, and 7209 manufactured by Dainippon Ink & Chemicals, Inc.; Vylon UR8200, UR8300, UR8600, UR5500, UR4300, RV530, and RV280 manufactured by Toyobo Co., Ltd.; Daipheramin 4020, 5020, 5100, 5300, 9020, 9022, and 7020 manufactured by Dainichiseika Color & Chemicals Mfg., Co., Ltd.; MX5004 manufactured by Mitsubishi Kasei Corporation; Sunprene SP-150, TIM-3003, and TIM-3005 manufactured by Sanyo Chemical Industries, Co., Ltd.; and Saran F310 and F210 manufactured by Asahi Chemical Industry Co., Ltd.

The amount of the binder used in the lower nonmagnetic layer or in the lower or upper magnetic layer in the present invention is from 5 to 50% by weight, preferably from 10 to 30% by weight, based on the amount of the nonmagnetic particles or the ferromagnetic particles, respectively. In employing a vinyl chloride resin, it is preferred to use the same in an amount of from 5 to 30% by weight in combination with from 2 to 20% by weight polyurethane resin and from 2 to 20% by weight polyisocyanate. In using polyurethane in the present invention, this resin preferably has a glass transition temperature of from −50° to 100° C., an elongation at break of from 100 to 2,000%, a stress at break of from 0.05 to 10 kg/cm$^2$, and a yield point of from 0.05 to 10 kg/cm$^2$.

The magnetic recording medium of the present invention has one or more layers. It is, of course, possible to form the nonmagnetic layer and the magnetic layers so that these layers differ from each other in binder amount, the proportion of a vinyl chloride resin, polyurethane resin, polyisocyanate, or another resin in the binder, the molecular weight of each resin contained in each magnetic layer, polar group amount, the aforementioned physical properties of resin according to need. For attaining this, known techniques concerning multilayered magnetic layers are applicable. For example, in the case of forming layers having different binder amounts, an increase in binder amount in the upper magnetic layer is effective in diminishing the marring of the upper magnetic layer surface, while an increase in binder amount in either the upper magnetic layer or the lower nonmagnetic layer to impart flexibility is effective in improving head touching.

Examples of the polyisocyanate for use in the constituent layers of the magnetic recording medium of the present invention include isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate, products of the reactions of these isocyanates with polyalcohols, and polyisocyanates formed through condensation of isocyanates. These isocyanates are commercially available under the trade names of: Coronate L, Coronate HL, Coronate 2030, Coronate 2031, Millionate MR, and Millionate MTL manufactured by Nippon Polyurethane Co., Ltd.; Takenate D-102, Takenate D-110N, Takenate D-200, and Takenate D-202 manufactured by Takeda Chemical Industries, Ltd.; and Desmodule L, Desmodule IL, Desmodule N, and Desmodule HL manufactured by Sumitomo Bayer Co., Ltd. For each of the layers, these polyisocyanates may be used alone, or used in combination of two or more thereof, taking advantage of a difference in curing reactivity.

The carbon black for use in the magnetic layer in the present invention includes furnace black for rubbers, thermal black for rubbers, coloring black, and acetylene black. The carbon black preferably has a specific surface area of from 5 to 500 $m^2/g$, a DBP absorption of from 10 to 400 ml/100g, a particle diameter of from 5 to 300 mμ, a pH of from 2 to 10, a water content of from 0.1 to 10%, and a tap density of from 0.1 to 1 g/cc. Specific examples of carbon blacks usable in the present invention include BLACKPEARLS 2000, 1300, 1000, 900, 800, 700, and VULCAN XC-72 manufactured by Cabot Corporation; #80, #60, #55, #50, and #35 manufactured by Asahi Carbon Co., Ltd.; #2400B, #2300, #900, #1000, #30, #40, and #10B manufactured by Mitsubishi Kasei Corporation; and CONDUCTEX SC manufactured by Columbia Carbon Co.; and RAVEN 150, 50, 40, and 15 manufactured by RAVEN. These carbon blacks may be surface-treated with a dispersant or another agent or grafted with a resin before use. A carbon black whose surfaces have been partly graphitized may also be used. Further, before being added to a magnetic coating fluid, the carbon black may be dispersed into a binder. These carbon blacks can be used alone or in combination. The carbon black is preferably used in an amount of from 0.1 to 30% by weight based on the amount of the ferromagnetic particles. The carbon black incorporated in the magnetic layer functions to prevent static buildup in the layer, to reduce the coefficient of friction of the layer, as a light screen for the layer, and to improve the strength of the layer. Such effects are produced to different degrees depending on the kind of carbon black used. Therefore it is, of course, possible in the present invention to properly use carbon blacks according to the purpose so as to give an upper magnetic layer, a lower nonmagnetic layer, and a lower magnetic layer which differ in the kind, amount, and combination of carbon blacks, on the basis of the above-described properties including particle size, oil absorption, electrical conductivity, and pH. With respect to carbon blacks usable in the magnetic layer in the present invention, reference may be made to, for example, *Carbon Black Binran* (*Carbon Black Handbook*) edited by Carbon Black Association.

In the present invention, an abrasive material is used in the upper magnetic layer and may also be used in the lower magnetic layer. Known abrasive materials mostly having a Mohs' hardness of 6 or more can be used alone or in combination. Examples thereof include α-alumina having an α-alumina structure content of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. A composite made up of two or more of these abrasive materials (e.g., one obtained by surface-treating one abrasive material with another) may also be used. Although in some cases these abrasive materials contain compounds or elements other than the main component, the same effect is obtained with such abrasive materials as long as the content of the main component is 90% or more. These abrasive materials preferably have a particle size of from 0.01 to 2 μm. If desired and needed, abrasive materials having different particle sizes may be used in combination, or a single abrasive material having a widened particle diameter distribution may be used so as to produce the same effect. The abrasive material preferably has a tap density of from 0.3 to 2 g/cc, a water content of from 0.1 to 5%, a pH of from 2 to 11, and a specific surface area of from 1 to 30 $m^2/g$. Although abrasive materials that can be used in the present invention may have any particle shape selected from the acicular, particulate, spherical, and cubical forms, a particle shape having a sharp corner as part of the contour is preferred because abrasive materials of this shape have high abrasive properties.

Part or all of the additives to be used in the present invention may be added at any step in a process for producing a magnetic or nonmagnetic coating fluid. For example, it is possible: to mix the additives with ferromagnetic particles prior to a kneading step; to add the additives during the kneading of ferromagnetic particles, a binder, and a solvent; to add the additives at a dispersing step; to add the additives after dispersion; or to add the additives immediately before coating. There are cases where the purpose is achieved by applying part or all of the additives, according to the purpose, by simultaneous or successive coating after magnetic layer application. Further, it is possible, according to purpose, to apply a lubricant on the magnetic layer surface after calendering or slitting.

Examples of marketed lubricant products for use in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hardened castor oil fatty acid, NAA-42, NAA-44, Cation SA, Cation MA, Cation AB, Cation BB, Naymeen L-201, Naymeen L-202, Naymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion 0-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid manufactured by NOF Corporation; oleic acid manufactured by Kanto Chemical Co., Ltd.; FAL-205 and FAL-123 manufactured by Takemoro Yushi Co., Ltd.; Enujerub LO, Enujerub IPM, and Sansosyzer E4043 manufactured by Shin Nihon Rika Co., Ltd.; TA-3, KF-96, KF-96L, KF-96H, KF410, KF420, KF965, KF54, KF50, KF56, KF-907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935 manufactured by Shin-Etsu Chemical Co., Ltd.; Armide P, Armide C, and Armoslip CP manufactured by Lion Ahmer Co., Ltd.; Duomin TDO manufactured by Lion Fat and Oil Co., Ltd.; BA-41G manufactured by Nisshin Oil Mills Co., Ltd.,; and Profan 2021E, Newpole PE61, Ionet MS-400, Ionet MO-200, Ionet DL-200, Ionet DS-300, Ionet DS-1000, and Ionet DO-200 manufactured by Sanyo Chemical Co., Ltd.

Examples of organic solvents for use in the present invention include ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ethers, glycol monoethyl ethers, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; and other compounds such as N,N-dimethylformamide and hexane. These solvents may be used in arbitrary proportions. These organic solvents need not be 100% pure, and may contain impurities, such as isomers, unreacted raw materials, by-products, decomposition products, oxidation products, and water, besides the main components. The content of these impurities is preferably 30% or less, more preferably 10% or less. It is preferred in the present invention that the organic solvent used for the upper layer be of the same kind as that used for the lower layer. Different solvent amounts may be used for the two layers. It is important that solvents having higher surface tensions (e.g., cyclohexanone, dioxane) should be used for the lower layer to enhance the stability of coating. Specifically, the arithmetic mean thereof for the upper layer solvents should be not lower than that for the lower layer solvents. From the standpoint of improving dispersibility, solvents which are polar to some degree are preferred, and a preferred solvent composition is one at least 50% of which is accounted for by one or more solvents having a dielectric constant of 15 or more. The preferred range of solubility parameter is from 8 to 11.

The thickness of each constituent layer of the magnetic recording medium according to the present invention is as follows. The thickness of the nonmagnetic support is from 1 to 100 µm, preferably from 4 to 20 µm. The total thickness of the upper layer and the lower layer is from 1/100 to 2 times the thickness of the nonmagnetic support. An undercoat layer may be provided between the nonmagnetic support and the lower layer in order to improve adhesion. The thickness of this undercoat layer may be from 0.01 to 2 µm, preferably from 0.02 to 0.5 µm. Further, a back coat layer may be provided on the nonmagnetic support on the side opposite to the magnetic layer. The thickness of this back coat layer may be from 0.1 to 2 µm, preferably from 0.3 to 1.0 µm. These undercoat layer and back coat layer may be the same as known ones. The nonmagnetic support for use in the present invention may be a known film. Examples thereof include films of polyesters such as poly(ethylene terephthalate) and poly(ethylene naphthalate), polyolefins, cellulose triacetate, polycarbonates, polyamides, polyimides, poly(amide-imide)s, polysulfone, aramids, aromatic polyamides, and polybenzoxazole. In using a thin support having a thickness of 7 µm or less, the support is preferably made of a high-strength material such as poly(ethylene naphthalate) or polyamide. If desired and needed, a laminate support such as that described in JP-A-3-224127 may be used in order that the magnetic layer surface and the base surface have different surface roughnesses. These supports may be subjected beforehand to, e.g., corona discharge treatment, plasma treatment, adhesion-promoting treatment, heat treatment, dust-removing treatment. In order to attain the objects of the present invention, it is preferred to employ a nonmagnetic support having a center-line average surface roughness of 0.03 µm or less, preferably 0.01 µm or less, and more preferably 0.005 µm or less, as measured at a cut-off of 0.08 mm. In addition to the requirement of low center-line average surface roughness, the nonmagnetic supports are required to be preferably free from projections as large as 1 µm or more. The state of the surface roughness of the support can be freely controlled by changing the size and amount of a filler which is incorporated into the support if desired and needed. Examples of the filler include oxides or carbonates of Ca, Si, and Ti and fine organic powders such as acrylic powder. The support preferably has a maximum height $SR_{max}$ of 1 µm or less, a ten-point average roughness $SR_z$ of 0.5 µm or less, a center-plane peak height SRp of 0.5 µm or less, a center-plane valley depth SRv of 0.5 µm or less, a center-plane areal ratio SSr of from 10% to 90%, and an average wavelength $S\lambda a$ of from 5 µm to 300 µm. The number of surface projections having a size of from 0.01 to 1 µm present on these supports can be controlled with a filler of from 0 to 2,000 per 0.1 mm$^2$.

The nonmagnetic support for use in the present invention preferably has an F-5 value in the tape running direction of from 5 to 50 kg/mm$^2$ and an F-5 value in the tape width direction of from 3 to 30 kg/mm$^2$. Although the F-5 value in the tape length direction is generally higher than that in the tape width direction, this does not apply in the case where the width-direction strength, in particular, should be enhanced. The degrees of thermal shrinkage of the support in the tape running direction and in the tape width direction are preferably 3% or less, more preferably 1.5% or less, under conditions of 100° C. and 30 minutes, and are preferably 1% or less, more preferably 0.5% or less, under conditions of 80° C. and 30 minutes. The strength at break thereof in each of both directions is preferably from 5 to 100 kg/mm$^2$, and the modulus thereof is preferably from 100 to 2,000 kg/mm$^2$.

A process for preparing a magnetic coating fluid to be used for producing the magnetic recording medium of the present invention comprises at least a kneading step and a dispersing step, and may further comprise a mixing step that may be conducted, if needed, before and after the two steps. Each step may include two or more stages. Each of the materials for use in the present invention, including ferromagnetic particles, inorganic nonmagnetic particles, binder, carbon black, abrasive material, antistatic agent, lubricant, and solvent, may be added in any step either at the beginning of or during the step. Further, the individual raw materials may be added portion-wise in two or more steps. For example, a polyurethane may be added portion-wise in each of the kneading step, the dispersing step, and the mixing step for viscosity adjustment after the dispersion. Conventionally known manufacturing techniques can, of course, be used as part of the process to attain the object of the present invention. Use of a kneading machine having high kneading power, such as a continuous kneader or pressure kneader, in the kneading step is advantageous in that improved gloss is obtained. In using a continuous kneader or pressure kneader, the ferromagnetic or nonmagnetic particles are kneaded together with all or part (preferably at least 30%) of the binder, the binder amount being in the range of from 15 to 500 parts by weight per 100 parts by weight of the ferromagnetic particles. Details of this kneading treatment are given in JP-A-1-166338 and JP-A-64-79274. For preparing a coating fluid for the nonmagnetic layer, use of a dispersing medium having a high specific gravity is desirable. A preferred example thereof is zirconia beads.

The following constitutions can be proposed as exemplary coating apparatuses and methods for producing multilayered magnetic recording media such as that of the present invention.

1. A lower layer is first applied with a coating apparatus commonly used for magnetic coating fluid application, e.g., a gravure coating, roll coating, blade coating, or extrusion coating apparatus, and an upper layer is then applied, while the lower layer is in a wet state, by means of a support-pressing extrusion coater such as those disclosed in JP-B-1-46186, JP-A-60-238179, and JP-A-2-265672.

2. An upper layer and a lower layer are applied almost simultaneously using a single coating head having therein two slits for passing coating fluids, such as those disclosed in JP-A-63-88080, JP-A-2-17971, and JP-A-2-265672.

3. An upper layer and a lower layer are applied almost simultaneously with an extrusion coater equipped with a back-up roll, such as that disclosed in JP-A-2-174965.

In order to prevent the electromagnetic characteristics and other properties of the magnetic recording medium from being impaired by aggregation of ferromagnetic particles, shearing is preferably applied to the coating fluid present in the coating head by a method such as those disclosed in JP-A-62-95174 and JP-A-1-236968. The viscosity of each coating fluid should be in the range as specified in JP-A-3-8471.

In the present invention, the methods described above are preferably used for producing a multilayered magnetic recording medium. Also in the case of forming two magnetic layers and one nonmagnetic layer, each of the above-described methods is easily applicable to the formation of these three layers. It is, however, possible to use a method in which a nonmagnetic layer is applied and dried before a lower magnetic layer and an upper magnetic layer are simultaneously formed thereon, or a method in which a nonmagnetic layer and a lower magnetic layer are simultaneously formed and dried before an upper magnetic layer is formed thereon.

A known orientation apparatus may be used for producing the magnetic recording medium of the present invention. However, like-pole-facing cobalt magnets, unlike-pole-facing cobalt/solenoid magnets, and superconducting magnets are preferred. During the application of a magnetic field, the amount of the organic solvent contained in the coating is preferably regulated to a value within the range specified hereinabove by controlling the temperature and amount of the air fed for drying or by controlling the rate of coating. In other words, it is preferred that the place in which the coating is dried be made controllable. The rate of coating is from 20 to 1,000 m/min, preferably from 100 to 800 m/min, and more preferably from 200 to 600 m/min, and the temperature of the drying air is usually from 40° to 100° C., preferably from 60° to 100° C., and more preferably from 80° to 100° C. As stated above, predrying may be performed to an appropriate degree before the coated support enters the magnet zone.

Examples of calendering rolls that can be used for producing the magnetic recording medium of the present invention include rolls of a heat-resistant plastic, e.g., epoxy, polyimide, polyamide, or poly(imide-amide), and metal rolls. Preferred is calendering with metal rolls. The calendering temperature is usually from 20° to 150° C., preferably from 70° to 120° C., and more preferably from 100° to 110° C. The linear pressure is usually from 50 to 500 kg/cm, preferably from 200 to 400 kg/cm, and more preferably from 300 to 400 kg/cm.

The magnetic recording medium of the present invention has the following properties. The coefficients of friction of the upper magnetic layer surface and the opposite side surface with SUS420J are 0.5 or less, preferably 0.3 or less, throughout the temperature range of from −10° C. to 40° C. and the humidity range of from 0% to 95%. The surface resistivity on both sides is preferably from $10^4$ to $10^{12}$ Ω/sq, and the electrification potential thereof is preferably from −500 V to 500 V. The modulus at 0.5% elongation of the upper magnetic layer is preferably from 100 to 2,000 kg/mm$^2$ in both the running and width directions, and the strength at break thereof is preferably from 1 to 30 kg/cm$^2$. The modulus of the magnetic recording medium is preferably from 100 to 1,500 kg/mm$^2$ in both running and width directions, the residual elongation thereof is preferably 0.5% or less, and the thermal shrinkage thereof at temperature of 100° C. or less is preferably 1% or less, more preferably 0.5% or less, and especially preferably 0.1% or less. The glass transition temperature (the temperature at which the loss modulus in a dynamic viscoelasticity measurement at 110 Hz becomes maximum) of the upper magnetic layer is preferably from 50° to 120° C., while that of the lower nonmagnetic or lower magnetic layer is preferably from 0° to 100° C. The loss modulus is preferably from $1 \times 10^8$ to $8 \times 10^9$ dyne/cm$^2$, and the loss tangent is preferably 0.2 or less. Too large loss tangents tend to result in troubles due to sticking. The residual solvent content in the upper layer is preferably 100 mg/m$^2$ or less, more preferably 10 mg/m$^2$ or less. It is preferred that the residual solvent content in the upper layer be lower than that in the lower layer. The void content in each of the upper layer and the lower layer is preferably 30% by volume or less, more preferably 20% by volume or less. Although a lower void content is desirable for attaining higher output, there are cases where a certain degree of void content is preferred according to purpose. For example, in the case of a magnetic recording medium for data recording use where suitability for repeated running operations is important, higher void contents in most cases bring about better running durability.

The upper layer has a center-line surface roughness Ra of 0.008 μm or less, preferably 0.003 μm or less, and an RMS surface roughness $R_{RMS}$ as determined with an AFM is preferably from 2 nm to 15 nm. The upper layer has preferably a maximum height SRmax of 0.5 μm or less, a ten-point average roughness SRz of 0.3 μm or less, a center-plane peak height SRp of 0.3 μm or less, a center-plane valley depth SRv of 0.3 μm or less, a center-plane areal ratio SSr of from 20% to 80%, and an average wavelength S$\lambda$a of from 5 μm to 300 μm. The upper layer surface may have from 0 to 2,000 projections having a size of from 0.01 μm to 1 μm. The number of these projections can be easily controlled, for example, by regulating the surface irregularities of the support with a filler or by the surface irregularities of calendering rolls.

The magnetic recording medium of the present invention, which preferably has a lower layer and an upper layer, can be made to have a difference in physical property between the lower layer and the upper layer according to purpose, as can be easily presumed. For example, the upper layer is made to have a heightened modulus to improve running durability and, at the same time, the lower layer is made to have a lower modulus than the upper layer to improve the head touching of the magnetic recording medium.

The present invention is explained below by the following examples, but the invention is not construed as being limited thereto. In the examples, all parts, percents and ratios are by weight unless otherwise indicated.

EXAMPLES <Production of Hexagonal-Ferrite Magnetic Particles, 1>

Various compounds as raw materials for hexagonal-ferrite production were weighed out in the following amounts in terms of oxide amounts.

| | |
|---|---|
| $B_2O_3$ | 7.1 mol |
| BaO | 10.0 mol |
| $Fe_2O_3$ | X1 mol |
| M1O | Y1 mol |
| $M2O_2$ | Z1 mol |

The weighed compounds were sufficiently mixed by a powder mixer. The resulting mixture was placed in a zirconia crucible equipped with a stirrer, and melted by heating at from 1,300 to 1,350° C. The melt was jetted into the nip between a pair of revolving cooling rolls made of stainless steel to obtain an amorphous substance. This amorphous substance was placed in an electric furnace, where the substance was heated to 500° C. at a rate of 150° C./hr, maintained at that temperature for 6 hours, subsequently heated to 800° C., maintained at this temperature for 5 hours, and then cooled to room temperature at a rate of 120° C./hr to obtain crystal powders. This crystal powders were ground with a planetary mill, and the ground powders were immersed in a 6 N aqueous acetic acid solution at 80° C. for 5 hours. Subsequently, the powders were washed with a large amount of water, dehydrated, dried at 100° C., and then deaerated with a muller to finally obtain ferromagnetic powders.

X-Ray analysis revealed that the ferromagnetic particles thus produced mainly had the M-form magnetoplumbite structure. The compositions of the thus-produced barium ferrites and the powder and magnetic properties thereof are shown in Table 1.

TABLE 1

| Magnetic powder unit | X1 mol | M1 | M2 | Y1 mol | Z1 mol | Hc Oe | σs emu/g | Specific surface area $m^2/g$ |
|---|---|---|---|---|---|---|---|---|
| A | 8.8 | Co | Ti | 1.2 | 1.2 | 1050 | 55 | 30 |
| B | 8.8 | Zn | Ti | 1.2 | 1.2 | 1120 | 54 | 31 |
| C | 9.0 | Co | Ti | 1.0 | 1.0 | 1260 | 55 | 28 |
| D | 9.0 | Zn | Ti | 1.0 | 1.0 | 1420 | 57 | 30 |
| E | 9.6 | Ni | Ti | 0.7 | 0.7 | 1680 | 60 | 30 |
| F | 11.2 | Co | Nb | 0.4 | 0.4 | 1800 | 61 | 34 |
| G | 11.2 | Zn | Nb | 0.4 | 0.4 | 1960 | 60 | 32 |

<Production of Hexagonal-Ferrite Magnetic Powders, 2>

Various compounds as raw materials for hexagonal-ferrite production were weighed out in the following amounts in terms of element amount.

| | |
|---|---|
| $Fe^{3+}$ | X2 mol |
| $M3^{2+}$ | Y2 mol |
| $M4^{4+}$ | Z2 mol |

The above compounds were dissolved in 4 liters of distilled water.

| | |
|---|---|
| $Ba^{2+}$ | 1.57 mol |

The Ba compound was dissolved in 3 liters of distilled water.

| | |
|---|---|
| NaOH | 164 mol |

The NaOH was dissolved in 4 liters of distilled water. The three aqueous solutions were mixed in a 20-l stainless-steel tank, while nitrogen gas was continuously bubbled into the mixture from the tank bottom with stirring. The slurry thus obtained was introduced into an autoclave and heated at 280° C for 4 hours with stirring. After being cooled to room temperature, the reaction mixture was taken out and subjected to solid-liquid separation. The solid obtained was sufficiently washed with water and dried at 100° C. The dry solid was placed in an electric furnace and maintained at 850° C. for 10 hours. Thereafter, the solid was cooled to room temperature, taken out of the furnace, and then deaerated with a muller to finally obtain hexagonal-ferrite magnetic particles (hereinafter also referred to simply as "magnetic particles").

X-Ray analysis revealed that the magnetic particles thus produced mainly had the M-form magnetoplumbite structure. The particle and magnetic properties of the thus-produced barium ferrites are shown in Table 2. An examination of the barium ferrites with an electron microscope revealed that the plate diameter thereof was 0.03 μm and the aspect ratio thereof regarding degree of flatness was 3.

TABLE 2

| Magnetic powder unit | X2 mol | M3 | M4 | Y2 mol | Z2 mol | Hc Oe | σs emu/g | Specific surface area $m^2/g$ |
|---|---|---|---|---|---|---|---|---|
| H | 16.0 | Co | Ti | 0.8 | 0.8 | 1150 | 55 | 49 |
| I | 16.0 | Co | Ti | 0.6 | 0.6 | 1380 | 54 | 50 |
| J | 15.0 | Zn | Ti | 0.56 | 0.56 | 1450 | 55 | 48 |
| K | 18.0 | Ni | Ti | 0.4 | 0.4 | 1820 | 59 | 53 |
| L | 18.0 | Zn | Nb | 0.3 | 0.3 | 2090 | 60 | 47 |
| M | 16.0 | Zn | Nb | 0.25 | 0.25 | 2130 | 55 | 52 |
| N | 16.0 | Ni | Nb | 0.15 | 0.15 | 2460 | 56 | 46 |
| O | 16.0 | Co | Nb | 0.4 | 0.6 | 1290 | 53 | 47 |

<Production of Coating Fluids>

Upper Magnetic Coating Fluid X:

| | |
|---|---|
| Barium ferrite (magnetic particles A to O) | 100 parts |
| Vinyl chloride copolymer | 12 parts |
| Containing $1 \times 10^{-4}$ eq/g —$PO_3Na$ | |
| Degree of polymerization | 300 |
| Polyester polyurethane resin | 3 parts |
| Neopentyl glycol/caprolactonepolyol/ | |
| MDI = 0.9/2.6/1 | |
| Containing $1 \times 10^{-4}$ eq/g —$SO_3Na$ group | |
| α-Alumina (particle size, 0.3 μm) | 2 parts |
| Carbon black (particle size, 0.015 μm) | 5 parts |
| Butyl stearate | 1 part |
| Stearic acid | 2 parts |
| Methyl ethyl ketone | 125 parts |
| Cyclohexanone | 125 parts |

Lower Magnetic Coating Fluid Y:

| | |
|---|---|
| Fine ferromagnetic iron oxide particles | 100 parts |
| Composition, Co-adsorbed iron oxide | |
| Hc | 800 Oe |
| BET specific surface area | 45 $m^2/g$ |
| Crystallite size | 200 Å |
| Surface-treating agent | 5 wt % $Al_2O_3$ |
| | 2 wt % $SiO_2$ |
| Particle size (major axis length) | 0.12 μm |
| Aspect ratio | 8 |
| σs | 76 emu/g |
| Vinyl chloride copolymer | 12 parts |
| Containing $1 \times 10^{-4}$ eq/g —$SO_3Na$ | |
| Degree of polymerization | 300 |
| Polyester polyurethane resin | 3 parts |
| Neopentyl glycol/caprolactonepolyol/ | |
| MDI = 0.9/2.6/1 | |
| Containing $1 \times 10^{-4}$ eq/g —$SO_3Na$ group | |
| α-Alumina (particle size, 0.3 μm) | 2 parts |
| Carbon black (particle size, 0.10 μm) | 0.5 parts |
| Butyl stearate | 1 part |
| Stearic acid | 5 parts |
| Methyl ethyl ketone | 100 parts |
| Cyclohexanone | 20 parts |
| Toluene | 60 parts |

-continued

Lower Nonmagnetic Coating Fluid Z:

| | |
|---|---|
| Inorganic nonmagnetic particles, $TiO_2$ | 80 parts |
| Crystal system | rutile |
| Average primary-particle diameter | 0.035 μm |
| BET specific surface area | 40 $m^2/g$ |
| pH | 7 |
| $TiO_2$ content | 90% or more |
| DBP oil absorption | 27–38 ml/100 g |
| Surface-treating agent | 8 wt % $Al_2O_3$ |
| Carbon black | 20 parts |
| Average primary-particle diameter | 16 mμ |
| DBP oil absorption | 80 ml/100 g |
| pH | 8.0 |
| BET specific surface area | 250 $m^2/g$ |
| Volatile content | 1.5% |
| Vinyl chloride copolymer | 12 parts |
| Containing $1 \times 10^{-4}$ eq/g —$SO_3Na$ | |
| Degree of polymerization | 300 |
| Polyester polyurethane resin | 5 parts |
| Neopentyl glycol/caprolactonepolyol/ | |
| MDI = 0.9/2.6/1 | |
| Containing $1 \times 10^{-4}$ eq/g —$SO_3Na$ group | |
| Butyl stearate | 1 part |
| Stearic acid | 1 part |
| Methyl ethyl ketone/cyclohexanone (8/2 mixed solvent) | 250 parts |

With respect to each of the above three coating fluids, the ingredients were kneaded with a continuous kneader and then dispersed with a sand mill. To the resulting dispersions was added a polyisocyanate in an amount of 3 parts for nonmagnetic coating fluid Z and in an amount of 5 parts for each of upper magnetic coating fluid X and lower magnetic coating fluid Y. The dispersions were filtered through a filter having an average opening diameter of 1 μm. Thus, lower nonmagnetic coating fluid Z, upper magnetic coating fluid X, and lower magnetic coating fluid Y were prepared.

<Production of Magnetic Recording Media>

EXAMPLE 1

A poly(ethylene naphthalate) support having a thickness of 7 μm and a center-line surface roughness of 0.002 μm was coated by simultaneous double coating with lower nonmagnetic coating fluid Z at a dry thickness of 3 μm and with upper magnetic coating fluid X at a dry thickness of 0.8 μm. The coated support was passed through an orientation zone which had a 1 m-long solenoid magnet having a magnetic force of 3,000 G and to which 100° C. dry air was continuously fed. Thus, longitudinal orientation was performed together with drying. Thereafter, the web was calendered with a 7-roll calender in which all the rolls were metal rolls, at a linear pressure of 300 kg/cm and a temperature of 100° C. The calendered web was slit into a 8-mm width to produce a 8-mm video tape. Thus, magnetic recording media (hereinafter abbreviated as "media") 1 to 15 (excluding 5) were obtained which corresponded to the magnetic powders used in upper magnetic coating fluid X.

EXAMPLE 2

Media 5 and 16 were produced in the same manner as in Example 1, except that a poly(ethylene naphthalate) support having a thickness of 7 μm and a center-line surface roughness of 0.002 μm was coated by simultaneous double coating with lower nonmagnetic coating fluid Z at a dry thickness of 2 μm and with upper magnetic coating fluid X (containing magnetic powder E) at a dry thickness of 1.5 μm, and that the power supply to the solenoid was switched off to dry the coating without orientation.

EXAMPLE 3

Medium 20 was produced in the same manner as in Example 1 (the medium employing magnetic powder G), except that lower magnetic coating fluid Y was used in place of lower nonmagnetic coating fluid Z. The magnetic properties and HK of this medium were regarded as the same as those of medium 8, which had a lower nonmagnetic layer, because those properties were influenced by the ferromagnetic particles contained in the lower layer.

EXAMPLE 4

A poly(ethylene naphthalate) support having a thickness of 7 μm and a center-line surface roughness of 0.002 μm was coated only with upper magnetic coating fluid X (containing magnetic powder F or G) at a dry thickness of 3.0 μm. The subsequent procedure was carried out in the same manner as in Example 1 to produce media 17, 18, and 19.

Media 1 to 20 thus produced were evaluated by the methods described below. The results obtained are shown in Table 3.

Evaluation Methods (Magnetic Properties)
Measurements were made in an applied magnetic field of 10 kOe with VSM-5, manufactured by Toei Kogyo Co., Ltd.
(HK)
Using torquemeter TRT-2, manufactured by Toei Kogyo K.K., a demagnetized sample was examined for rotational hysteresis loss Wr from a low intensity of magnetic field to 10 kOe. The values of Wr were plotted against the reciprocal of intensity of applied magnetic field, 1/H, and the intensity of applied magnetic field at which Wr became 0 on the higher magnetic-intensity side was determined by extrapolating a straight portion of the Wr curve; this intensity was taken as HK. The values of Rh and Hp (the intensity of magnetic field at the peak of the curve of r against 1/H) which were obtained from the same measurement are given in Table 3. Rh is integrated rotational hysteresis.
(Electromagnetic Characteristics)
A 1.0-T head (output 1) or a 1.5-T head (output 2) was mounted on 8-mm video deck FUJIX8, manufactured by Fuji Photo Film Co., Ltd., to record 10 MHz signals. The recorded signals were reproduced and the output thereof was measured with an oscilloscope. Medium 1 was used as the reference, with the output value therefor with respect to each head being taken as 0 dB.

TABLE 3

| Medium | Magnetic particles | Bm G | Hc Oe | SQ — | Hc/HK — | HK Oe | Rh — | Hp Oe | Output 1 dB | Output 2 dB | Remarks |
|---|---|---|---|---|---|---|---|---|---|---|---|
| 1 | A | 1850 | 1110 | 0.85 | 0.18 | 6167 | 1.70 | 1420 | 0.0 | 0.0 | Comp. |
| 2 | B | 1850 | 1220 | 0.85 | 0.33 | 3697 | 1.05 | 1550 | 0.8 | 0.2 | Comp. |
| 3 | C | 1850 | 1380 | 0.80 | 0.28 | 4929 | 1.40 | 1600 | 0.4 | −0.6 | Comp. |
| 4 | D | 1870 | 1560 | 0.72 | 0.35 | 2166 | 1.10 | 1820 | 1.9 | 1.5 | Inv. |
| 5 | D | 1870 | 1510 | 0.56 | 0.34 | 4441 | 0.80 | 1830 | 0.5 | 0.4 | Comp. |
| 6 | E | 1850 | 1730 | 0.85 | 0.43 | 4023 | 1.20 | 1960 | 1.0 | 2.5 | Inv. |
| 7 | F | 1900 | 1890 | 0.86 | 0.28 | 6750 | 1.40 | 2130 | 0.2 | 0.8 | Comp. |

TABLE 3-continued

| Medium | Magentic particles | Bm G | Hc Oe | SQ | Hc/HK | HK Oe | Rh | Hp Oe | Output 1 dB | Output 2 dB | Remarks |
|---|---|---|---|---|---|---|---|---|---|---|---|
| 8 | G | 1870 | 2040 | 0.88 | 0.48 | 4250 | 0.80 | 2200 | 0.5 | 2.7 | Inv. |
| 9 | H | 1800 | 1180 | 0.84 | 0.33 | 3576 | 1.00 | 1350 | 0.3 | 0.2 | Inv. |
| 10 | I | 1780 | 1590 | 0.87 | 0.36 | 4417 | 0.95 | 1540 | 2.0 | 1.4 | Inv. |
| 11 | J | 1760 | 1640 | 0.79 | 0.51 | 3216 | 0.70 | 1790 | 2.4 | 1.8 | Inv. |
| 12 | K | 1850 | 2010 | 0.82 | 0.23 | 8739 | 1.70 | 2250 | 0.3 | 0.4 | Comp. |
| 13 | L | 1840 | 2250 | 0.80 | 0.22 | 10227 | 1.80 | 2460 | −0.2 | 0.3 | Comp. |
| 14 | M | 1750 | 2350 | 0.81 | 0.76 | 3092 | 1.10 | 2560 | −0.5 | 3.8 | Inv. |
| 15 | N | 1740 | 2640 | 0.83 | 0.68 | 3882 | 0.55 | 2910 | −1.5 | 3.5 | Inv. |
| 16 | G | 1860 | 1960 | 0.55 | 0.50 | 3920 | 0.50 | 2260 | 1.4 | 0.9 | Comp. |
| 17 | G | 1870 | 2040 | 0.88 | 0.53 | 3849 | 0.90 | 2150 | 1.2 | 2.2 | Inv. |
| 18 | F | 1910 | 1880 | 0.86 | 0.28 | 6714 | 1.60 | 2100 | 0.4 | 1.0 | Inv. |
| 19 | G | 1870 | 2020 | 0.88 | 0.46 | 4391 | 1.00 | 2210 | 1.6 | 2.6 | Inv. |
| 20 | G | 1870 | 2040 | 0.88 | 0.48 | 4250 | 0.80 | 2200 | 0.7 | 2.6 | Inv. |
| 21 | O | 1860 | 1350 | 0.88 | 0.45 | 3000 | 1.05 | 1550 | 0.7 | −0.1 | Inv. |

All the media satisfying the constitutional requirements of the present invention, including the media having a multilayer coating consisting of a lower nonmagnetic layer and an upper magnetic layer, the medium having a multilayer coating consisting of a lower magnetic layer and an upper magnetic layer, and the media having a single-layer coating consisting of an upper layer, showed increased outputs. In contrast, the media not satisfying the constitutional requirements of the invention showed lower outputs.

The magnetic recording medium of the present invention, which has a magnetic layer containing hexagonal-ferrite magnetic particles, can have remarkably improved ultrashort-wavelength output necessary to high-density recording, because the magnetic layer has specific values of Hc, Hc/HK, and SQ of in-plane direction.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising a nonmagnetic support having thereon a magnetic layer comprising ferromagnetic particles dispersed in a binder, wherein the magnetic recording medium comprises a magnetic layer comprising hexagonal ferrite magnetic particles, the magnetic layer containing the hexagonal ferrite magnetic particles having a coercive force of from 1,700 to 5,000 Oe, an anisotropic magnetic field of more than 3,000 Oe a ratio of the coercive force to the anisotropic magnetic field thereof of from 0.30 to 1.0, and an in-plane squareness ratio of from 0.65 to 1.00, and wherein a nonmagnetic layer comprising inorganic nonmagnetic particles dispersed in a binder, a lower magnetic layer comprising ferromagnetic particles dispersed in a binder, or a multilayer structure comprising the nonmagnetic layer and the lower magnetic layer is provided on the nonmagnetic support, and the magnetic layer containing the hexagonal ferrite magnetic particles is provided on the nonmagnetic layer or the lower magnetic layer.

2. The magnetic recording medium as claimed in claim 1, wherein the magnetic layer containing the hexagonal ferrite magnetic particles has a coercive force, of from 1,700 to 4,000 Oe and a thickness of from 0.01 to 1 μm.

* * * * *